(No Model.) 4 Sheets—Sheet 1.

W. YOUNGJOHNS & W. TAYLOR.
J. L. NORRIS, Ancillary Administrator of W. TAYLOR, Deceased.
LOOM FOR WEAVING TUFTED FABRICS.

No. 490,530. Patented Jan. 24, 1893.

Witnesses.
J. A. Rutherford
Robert Everett.

Inventors
William Youngjohns,
William Taylor.
By James L. Norris,
Ancillary Administrator of
William Taylor, dec'd.

THE NORRIS PETERS CO., PHOTO-LITHO., WASHINGTON, D. C.

(No Model.) 4 Sheets—Sheet 2.
W. YOUNGJOHNS & W. TAYLOR.
J. L. NORRIS, Ancillary Administrator of W. TAYLOR, Deceased.
LOOM FOR WEAVING TUFTED FABRICS.
No. 490,530. Patented Jan. 24, 1893.
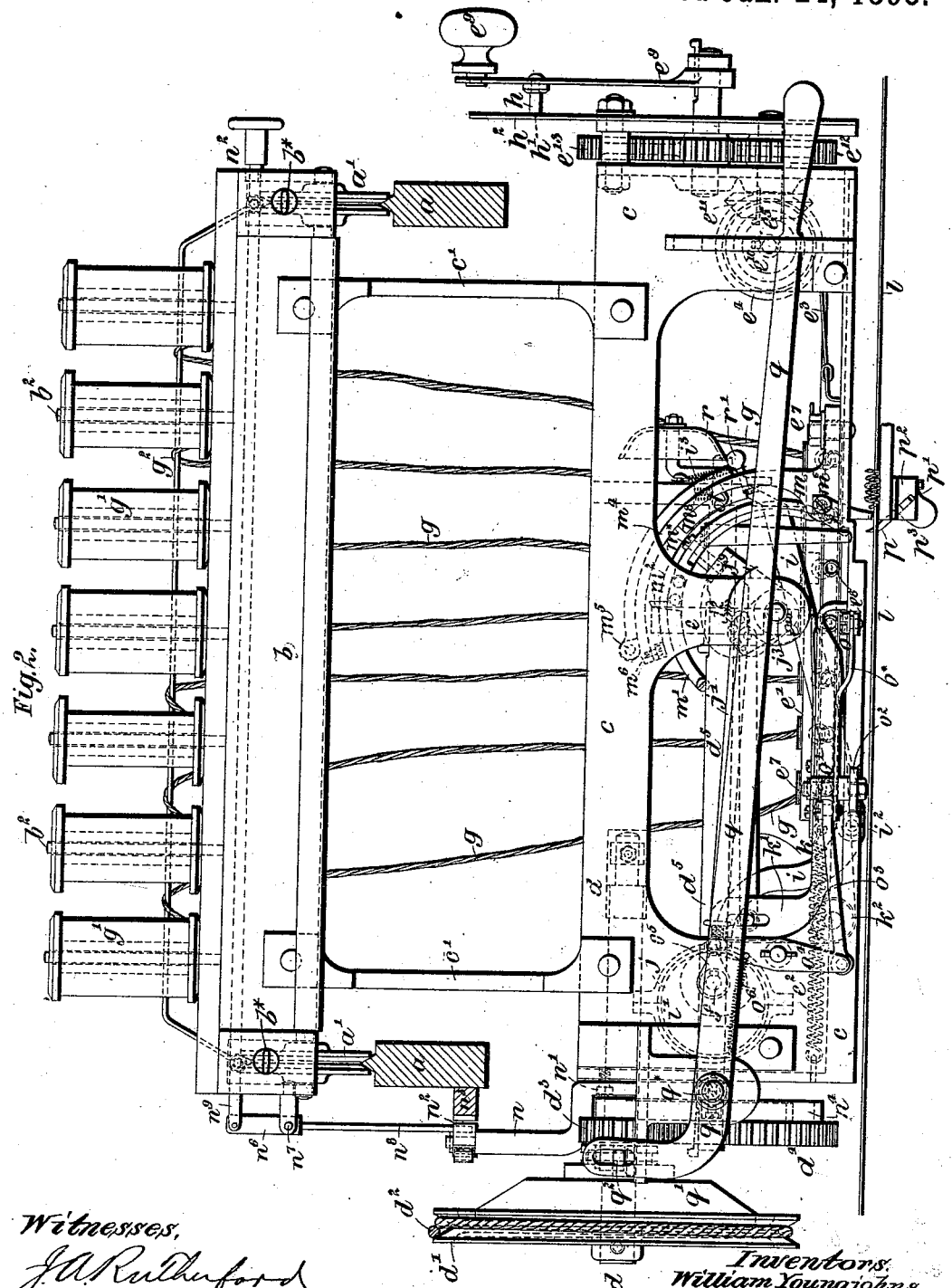

(No Model.) 4 Sheets—Sheet 3.
W. YOUNGJOHNS & W. TAYLOR.
J. L. NORRIS, Ancillary Administrator of W. TAYLOR, Deceased.
LOOM FOR WEAVING TUFTED FABRICS.
No. 490,530. Patented Jan. 24, 1893.
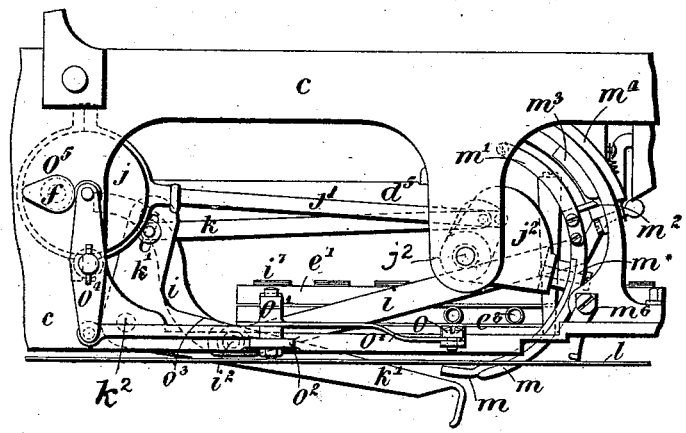
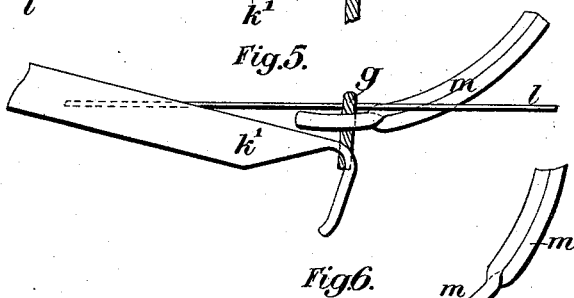
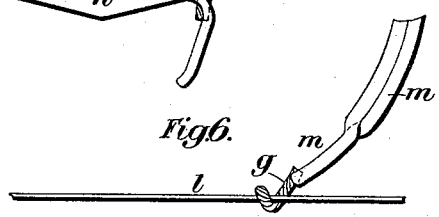
Witnesses.
Inventors,
William Youngjohns,
William Taylor,
By James L. Norris,
Ancillary Administrator of
William Taylor dec'd.

(No Model.) 4 Sheets—Sheet 4.

W. YOUNGJOHNS & W. TAYLOR.
J. L. NORRIS, Ancillary Administrator of W. TAYLOR, Deceased.
LOOM FOR WEAVING TUFTED FABRICS.

No. 490,530. Patented Jan. 24, 1893.

Witnesses.
J. A. Rutherford.
Robert Everett.

Inventors.
William Youngjohns.
William Taylor
By James L. Norris,
Ancillary Administrator
of William Taylor
dec'd.

UNITED STATES PATENT OFFICE.

WILLIAM YOUNGJOHNS, OF KIDDERMINSTER, ENGLAND, AND JAMES L. NORRIS, OF WASHINGTON, DISTRICT OF COLUMBIA; SAID JAMES L. NORRIS ANCILLARY ADMINISTRATOR OF WILLIAM TAYLOR, DECEASED.

LOOM FOR WEAVING TUFTED FABRICS.

SPECIFICATION forming part of Letters Patent No. 490,530, dated January 24, 1893.

Application filed October 31, 1891. Serial No. 410,511. (No model.) Patented in England October 20, 1886, No. 13,401.

*To all whom it may concern:*

Be it known that we, WILLIAM YOUNGJOHNS, a subject of the Queen of Great Britain, residing at Kidderminster, England, and WILLIAM TAYLOR, deceased, late a subject of the Queen of Great Britain, and a resident of Kidderminster, England, (JAMES L. NORRIS, a citizen of the United States, and a resident of Washington, District of Columbia, ancillary administrator of said TAYLOR,) have invented certain new and useful Improvements in Looms for Weaving Tufted Fabrics, (for which Letters Patent were obtained in Great Britain, No. 13,401, dated October 20, 1886,) of which the following is a specification.

Our invention relates to machinery or apparatus for manufacturing carpets and is chiefly designed for the production of Turkey carpets.

In our improved machinery, we employ feed-mechanism which is so constructed that any desired number of different colored worsteds can be fed thereby as required into position to be operated upon by the cutting and weaving mechanism. This feeding mechanism comprises a slide which is mounted in a box frame or carriage, arranged to move to and fro upon rails at the front of the loom and is provided with a series of apertures or passages through which the different colored worsteds are conducted from reels or bobbins suitably supported upon the loom or upon the said box frame or carriage. Feed rolls are arranged in conjunction with each of the said apertures or passages and the said slide is provided with means whereby it may be adjusted to bring either of the said feed-rolls into position to be operated by a feed-wheel or cam. This feed wheel or cam is so constructed that it will, in each rotation feed the required quantity of worsted through the feed-slide. In combination with this feed mechanism we employ a device for indicating to the attendant which color of worsted is being fed and woven and for enabling him to adjust the feed-slide according to the color of worsted which it is desired shall be fed and woven. We also provide a knife, cutter or pair of shears arranged to operate after the worsted has been fed through the aforesaid slide, to cut off a piece of the said worsted of the required length. Moreover, we employ a forked arm or lever and means for operating the same to push the ends of the pieces of worsted through the ground chain, in combination with a pair of nippers or tweezers and means for operating the same to seize the ends of the said pieces and draw them up between the threads of the said chain in the manner above specified.

The box frame or carriage in which the various devices above described are arranged is provided with means for intermittently moving it across the loom in front of the lathe to permit the mechanism to successfully insert the pieces of worsted; it is also provided with a counterweight or other suitable means for effecting its rapid return movement, after a row of pieces of worsted has been completed to bring the mechanism into position to commence a fresh row thereof.

In the accompanying drawings, Figure 1 is a plan, and Fig. 2 a side elevation of our improved mechanism. Fig. 3 is a side elevation of part of the said mechanism. Figs. 4, 5 and 6 are different views hereinafter described and drawn to an enlarged scale illustrating the improved method of weaving by the aid of the said mechanism. Fig. 7, is an end view of the feed slide and adjacent parts of our improved mechanism. Figs. 8, 9 and 10, are detail views of parts hereinafter explained.

$a$, $a$ are two rails which are suitably supported in front of the lathe of a power loom (not shown in the drawings) parallel to the said lathe, and which are provided with means (not shown in the drawings) for raising them when necessary to permit the operation of the lathe, and again lowering them.

$b$ is a carriage provided with rollers or wheels $a'$ and placed upon the said rails.

$c$ is a box or frame suspended from this carriage by means of rods $c'$.

A driving shaft $d$ is mounted in suitable bearings in the frame $c$ and has fixed thereon a pulley $d'$ whereby motion may be transmitted thereto from the driving shaft of the loom by means of a band or rope $d^2$. This shaft $d$ is connected by the gear wheels $d^3$ $d^4$ with another shaft $d^5$ also mounted in bearings in the said frame $c$ and having fixed thereon the feed wheel or cam $e$. The feed-shaft $d^5$ is connected by bevel pinions $d^6$, $d^7$ with another shaft $f$ for operating what we will, for convenience of description herein term the knotting mechanism.

$e'$ is the feed-slide which is arranged beneath the feed-shaft $d^5$ and is connected at one end to a spring $e^2$ and at its other end, to a strap or band $e^3$ arranged to be wound upon a drum or pulley $e^4$ fixed on a shaft $e^5$ which is mounted in the frame $c$ at right angles to the feed-shaft $d^5$ and which we will hereinafter term the winder-shaft. The said feed-slide is divided into as many compartments as there are colors in the carpet to be made, and a pair of feed-rolls $e^7$ is arranged in combination with each of the said compartments. These feed-rolls are held down by springs $e^*$ and will readily adjust themselves to any inequalities in the worsted. The different colored worsted $g$, $g$ are wound upon different bobbins $g'$, $g'$ placed upon pins $b^2$ fixed in the carriage $b$. Each worsted is conducted from the bobbin upon which it is wound through an aperture $e^8$ in one or other of the said compartments and between the corresponding feed-rolls $e^7$. The winder shaft $e^5$ for moving the slide to bring the colored worsteds into the proper position to be woven, is connected by the bevel wheels $e^{10}$, $e^{11}$ and gear wheels $e^{12}$, $e^{13}$ with a crank handle $e^9$. By turning this handle in one direction the aforesaid band $e^3$ will be wound upon its drum or pulley $e^4$ and the feed slide $e'$ thus moved in a direction parallel to the axis of the feed-shaft $d^5$ and the spring $e^2$ will be extended. When the said handle $e^9$ is turned in the reverse direction, the said spring $e^2$ will react and draw back the feed slide $e'$. The feed-slide can thus be adjusted to being either of its pairs of rolls $e^7$ into position to be operated by the feed wheel or cam $e$ according to the color of the worsted to be woven. The said crank handle $e^9$ is preferably provided with a stud or projection $h$ which will enter one or other of a series of holes or indentations $h'$ in a disk or segment $h^2$ Fig. 10 attached to the frame $c$ when either of the compartments of the feed slide $e'$ is in operative position. The said disk or segment is divided into parts corresponding in number with the bobbins on the machine, and the various parts are sometimes colored so as to indicate to the attendant what color of worsted is being woven. The attendant can by these means readily control the feed slide according to the pattern to be produced in the carpet. The end of the feed-shaft $d^5$ nearest the feed wheel or cam $e$ is preferably held down by a spring $d^8$ as shown in Fig. 8 so that the said wheel or cam will exert a yielding pressure upon the feed rolls $e^7$.

The feed mechanism is so arranged that it will feed the worsted into the proper position to be operated upon by the knotting mechanism, and a knife or cutter $i$ is arranged in combination with the feed mechanism, for cutting the worsted as soon as the feed movement ceases. The knife or cutter $i$ is pivoted at $i^2$ to the frame $c$ and is operated by means of a cam $i'$ fixed upon the shaft $f$ of the knotting mechanism, and a spring $i^3$ connected at one end to the said knife and at the other end to the frame $c$ or it may be operated in any other suitable manner. Any other suitable cutter may, moreover, be substituted for the said knife. The cutting edge of the said knife passes in contact with the surface of the slide $e'$ so that it will sever a piece from the worsted projecting from the said slide. The feed wheel or cam $e$ shown more clearly in Fig. 7 is provided upon its periphery with a piece $e^{14}$ of india-rubber, leather or other suitable material which, in each rotation of the said wheel will engage with the fluted periphery of one or other of the feed-rolls $e^7$ and rotate the said rolls. The length of this piece $e^{14}$ will determine the length of the pieces of worsted fed through the slide $e'$, and cut or severed in each operation of the feed and cutting mechanism. The said knotting mechanism is constructed as follows viz:—An eccentric $j$ is fixed upon the shaft $f$ and is coupled by means of an eccentric rod $j'$ to an arm or segment $j^2$ fitted to turn upon a pin or stud $j^3$ fixed in the frame $c$. This arm or segment $j^2$ is, moreover, coupled by means of a connecting rod or link $k$ with the short arm of a lever $k'$, which is pivoted at $k^2$ to the frame $c$ and the long arm of which is forked to adapt it for pushing the ends of the pieces of worsted through the ground chain $l$ so as to inclose two threads thereof. $m$, $m$ are the nippers or tweezers for seizing the ends of the pieces of worsted after they have been pushed through the chain by the lever $k'$ and drawing them up through the said chain; the two parts of these nippers are pivoted at $m^*$ to the said arm or segment $j^2$, and are curved to the form of an arc of a circle. They are provided with springs $m'$ which tend to keep them closed as in Fig. 9 and with studs $m^2$ which, when the said arm or segment $j^2$ is turned in the direction indicated by the arrow in Fig. 2 will strike a projection $m^3$ upon a lever or plate $m^4$ pivoted at $m^5$ to a bracket $m^6$ secured to the frame $c$ and the two jaws of the nippers will thus be moved apart or opened. As soon, however, as the said studs $m^2$ pass the said projection, that is to say, when they arrive in the position shown in Fig. 3, the springs $m'$ will immediately close the said nippers or tweezers and cause them to seize the ends of the piece of worsted which have been pushed through the chain by the lever $k'$. The said pivoted lever or plate $m^4$ is so arranged that in the return movement of the said arm or segment $j^2$ it will be raised by the said studs $m^2$ so that the latter can pass under it and the nippers or tweezers $m$ will remain closed until the said segment is again moved in the direction indicated by the arrow in Fig. 2.

A lever $n$ is pivoted at $n'$ to the box or frame $c$ and has a pawl $n^2$ pivoted to its upper end and adapted to engage with a rack $n^3$ fixed upon one of the aforesaid rails $a$. This lever $n$ is operated by a cam-groove $n^4$ in the toothed wheel $d^4$ to move the said frame intermittently across the loom. A retaining pawl $n^5$ is, moreover, pivoted to the said frame to prevent backward movement thereof. Suitable means are provided for throwing these pawls out of engagement with the rack when a row of pieces of worsted has been completed. For instance, a lever $n^6$ is pivoted at $n^7$ to the carriage $b$ and is provided with two rods $n^8$ which extend downward on the inner sides of the pawls $n^2$, $n^5$. This lever is coupled to a rod or bar $n^9$ whereby it may be operated to disengage the pawls from, or permit their engagement with the said rack $n^3$. A counterweight or a spring (not shown in the drawings) is attached to the carriage $b$ as indicated at $b^\times$ Figs. 1 and 2 for effecting the return motion of the frame $c$ when the said pawls are thus disengaged from the rack.

We have found in practice that as the worsted emerges from the apertures or tubes $e^8$ the end thereof is liable to drop so that it either catches one of the threads of the chain $l$ and is thus caused to double or fold or else passes between the threads of the chain so that the piece cut from the worsted will not be in the proper position to be acted upon by the knotting mechanism. To obviate this defect we provide what we term a "conveyer" consisting of a bar $o$ fitted to slide in a guide-way in the frame $c$ and formed with a rounded hollow on the top to receive the worsted. This bar is coupled to a lever $o^*$ pivoted at $o'$ to a bracket $o^2$ secured to the frame $c$ and is operated through the medium of a connecting rod $o^3$ and lever $o^4$ by a cam $o^5$ fixed on the shaft $f$. The said lever $o^4$ is held against this cam by a spring $o^6$. This conveyer receives the worsted from the slide $e'$ and lays it properly upon the chain as hereinafter described. We have also found that it is necessary to keep the threads of the chain at regular distances apart, otherwise the forked lever $k'$ is liable to push the ends of the pieces of worsted between the wrong threads of the chain, thus producing a fault in the carpet. To keep the said threads at regular distances apart we provide a comb $p$ fitted in slots $p'$ in brackets $p^2$ secured to any suitable part of the frame of the loom; springs $p^3$ are attached to the said brackets $p^2$ and tend to keep the teeth of the comb between the threads $l$ of the chain.

$q$ is a lever which is pivoted at $q^*$ and is connected by means of another lever $q^2$ pivoted at $q^3$ with a friction clutch $q'$ so that, by raising or depressing the said lever $q$ the shaft $d$ can be put into or out of gear with the driving pulley $d'$.

The lever $q$ is kept in the raised or depressed position, that is the shaft $d$ kept in or out of gear with the said driving pulley by any suitable means, for instance the said lever may be arranged to slide up and down in a slot and holes drilled in the sides of the said slot furnished with a pin to keep the said lever in position, or said lever may be arranged to spring into and out of notches in the sides of the slot or other methods may be used.

The operation of our improved mechanism is as follows: Assuming the parts to be in the positions indicated in Figs. 1 and 2 and the shaft $d$ connected by the clutch $q'$ with the driving pully $d'$, motion is transmitted by means of the gear-wheels $d^3$, $d^4$ to the feed shaft $d^5$ and through this shaft and the bevel wheels $d^6$, $d^7$ to the shaft $f$. The feed wheel $e$ operates the feed-rolls $e^7$ beneath it and thus causes a certain length of worsted (determined by the length of the piece $e^{14}$ of india-rubber on the said wheel) to be ejected from the corresponding aperture or tube $e^8$ of the slide $e'$. As the worsted issues from the tube in the feed-slide it falls on to and is supported by the hollow top part of the conveyer $o''$, and as more and more worsted is fed out by the feed rolls, the cam $o^5$ rotates, and allows the spring $o^6$ to draw back the conveyer through the medium of lever $o^4$ rod $o^3$ and lever $o^\times$ thereby leaving the worsted lying evenly upon the chain, the piece of worsted is then cut off by the knife $i$. The forked end of the lever $k'$ is now moved downward and caused to push the ends of the said piece of worsted down through the chain so as to inclose or encircle two of the threads of the chain as indicated by Figs. 4 and 5 and the said lever continues its descent until it assumes the position shown in Figs. 3 and 5.

Fig. 4 shows in plan the piece of worsted resting upon the chain and the lever $k'$ in position to push the ends of the said piece through the chain.

Fig. 5 shows, in side elevation the piece of worsted after its ends have been pushed through the chain by the said lever.

Figure 1:
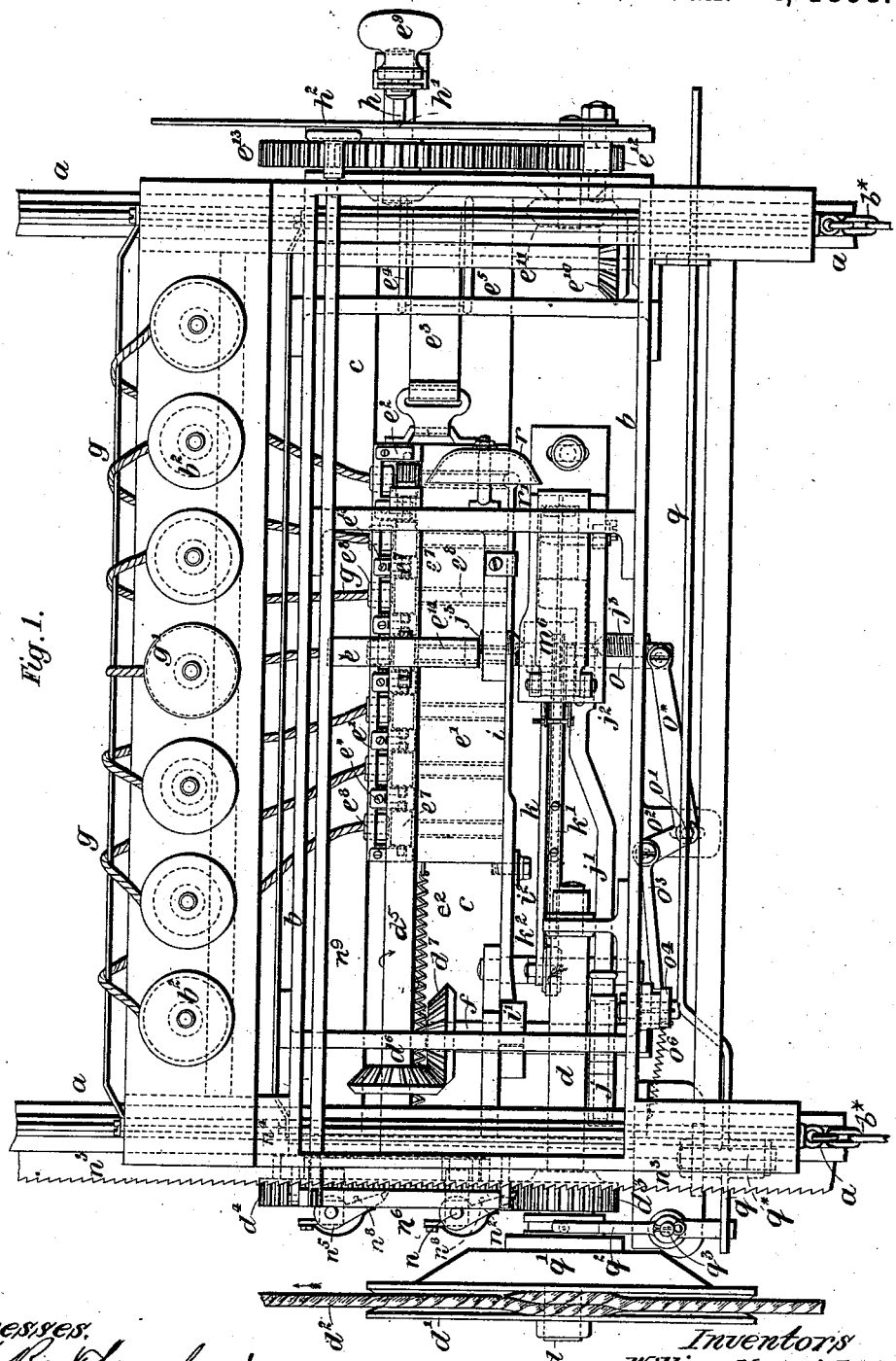
Figure 7:
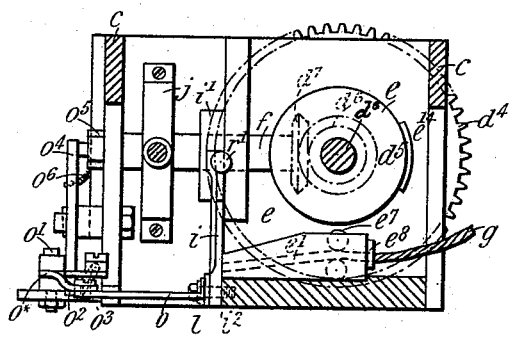
Figure 9:
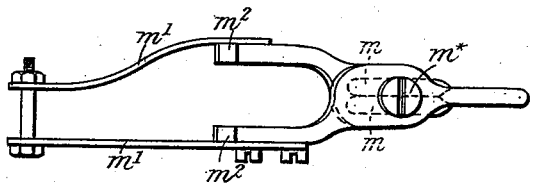
Figure 10:
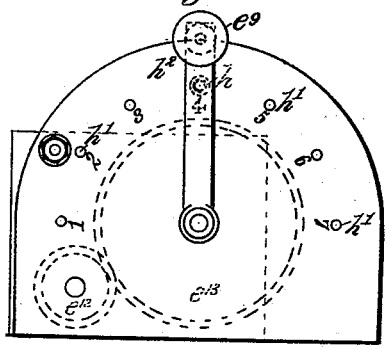
Figure 8:
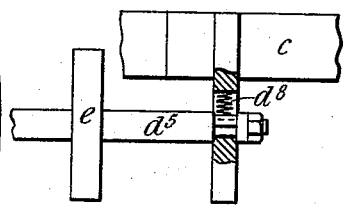

In the rotation of the shaft $f$ and eccentric $j$ the segment $j^2$ is partially rotated in the direction indicated by the arrow in Fig. 2 and the free ends of the nippers or tweezers $m$ are caused to pass between the threads of the chain and are then opened by the projection $m^3$, as soon as the studs $m^2$ have passed the projection $m^3$ the springs $m'$ close the said nippers and thus cause them to grip the ends of the piece of worsted as shown in Fig. 6, which is a side elevation. As the eccentric $j$ continues to rotate it draws back the segment $j^2$ and thus causes the nippers $m$ to draw the ends of the piece of worsted up between the threads of the chain as shown in Fig. 6, thus completing the operation. The cam groove $n^4$ then operates the lever $n$ and causes the pawl $n^2$ to engage with the teeth of the rack $n^3$ and move the carriage $b$ and the mechanism supported thereby into position for the next operation.

In some instances, we combine with a single loom two or more sets of the above described mechanism. This arrangement is especially advantageous for weaving carpets of great width as it enables several operators to work simultaneously at the same carpet.

In some instances we provide a bell $r$ and form or fix a hammer or clapper $r'$ on the knife $i$ so that after each length or piece has been cut or severed from the worsted the said bell will be sounded and the operator will then know that he may, if necessary adjust the slide $e$ to bring worsted of another color into position to be fed through the said slide.

What is claimed is:—

1. The combination with the carriage $b$ adapted to be moved on rails $a$, of feed mechanism comprising the feed slide $e'$, feed rolls $e^7$, cam wheel $e$ and means for operating the said cam wheel, substantially as and for the purpose specified.

2. The combination with the carriage $b$ adapted to be moved on rails $a$ of the knotting mechanism comprising the forked arm $k'$, the nippers $m$, the oscillating segment $j^2$ and an eccentric $j$ for driving the said segment, substantially as and for the purpose specified.

3. The combination with the carriage $b$ adapted to be moved on rails $a$, of feed mechanism comprising the feed slide $e'$, feed rolls $e^7$, cam wheel $e$, means for operating the said cam wheel, a knife or cutter $i$, and a cam $i'$ for operating the said knife, substantially as described.

4. The combination with the feed slide, of the feed rolls $e^7$ with means for operating the same, and a device for supporting the worsted as it issues from the said feed rolls and then permitting it to fall upon the ground chain substantially as and for the purpose specified.

5. The combination with a loom of the carriage $b$ adapted to be moved on rails $a$, feed mechanism comprising the feed slide $e'$, feed rolls $e^7$, cam wheel $e$, and means for operating the said cam wheel, the knife or cutter $i$ and a cam $i$ for operating the knife and knotting mechanism comprising the forked arm $k'$ nippers $m$ the oscillating segment $j^2$ and an eccentric $j$ for driving the said segment substantially as and for the purpose specified.

In testimony whereof we have hereunto signed our names in the presence of two subscribing witnesses.

WILLIAM YOUNGJOHNS.
JAMES L. NORRIS,
*Ancillary administrator.*

Witnesses to the signature of William Youngjohns:
JAMES NORTON,
FRED GADSBY.

Witnesses to the signature of James L. Norris:
JAMES A. RUTHERFORD,
GEORGE W. REA.